(12) United States Patent
Baumel et al.

(10) Patent No.: US 7,872,943 B2
(45) Date of Patent: Jan. 18, 2011

(54) METHOD OF ACCOUNTING FOR WAVELET STRETCH IN SEISMIC DATA

(75) Inventors: Robert T. Baumel, Ponca City, OK (US); Javaid A. Durrani, Houston, TX (US); Phil D. Anno, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 12/133,203

(22) Filed: Jun. 4, 2008

(65) Prior Publication Data

US 2008/0232196 A1    Sep. 25, 2008

Related U.S. Application Data

(62) Division of application No. 11/201,549, filed on Aug. 11, 2005, now Pat. No. 7,405,997.

(51) Int. Cl.
G01V 1/28    (2006.01)

(52) U.S. Cl. .......................................... 367/38; 367/73

(58) Field of Classification Search .................. 367/27, 367/28, 47, 52, 38, 73
See application file for complete search history.

(56) References Cited

U.S. PATENT DOCUMENTS

| | | | |
|---|---|---|---|
| 4,884,247 A | 11/1989 | Hadidi et al. | |
| 4,995,007 A | 2/1991 | Corcoran et al. | |
| 5,297,108 A | 3/1994 | Swan | |
| 5,583,826 A | 12/1996 | Soubaras | |
| 5,684,754 A | 11/1997 | Byun et al. | |
| 5,982,706 A | 11/1999 | Byun | |
| 6,021,379 A | 2/2000 | Duren et al. | |
| 6,131,071 A | 10/2000 | Partyka et al. | |
| 6,343,256 B1 | 1/2002 | Winbow et al. | |
| 6,516,275 B2 | 2/2003 | Lazaratos | |
| 6,519,532 B2 | 2/2003 | Meng | |
| 6,654,692 B1 | 11/2003 | Neff | |
| 6,745,129 B1 | 6/2004 | Li et al. | |
| 6,826,484 B2 * | 11/2004 | Martinez et al. | 702/14 |
| 6,985,405 B2 | 1/2006 | Ren et al. | |
| 7,072,767 B2 | 7/2006 | Routh et al. | |
| 7,167,414 B2 | 1/2007 | Lee et al. | |
| 7,196,969 B1 | 3/2007 | Karazincir | |
| 7,230,879 B2 * | 6/2007 | Herkenhoff et al. | 367/47 |
| 7,243,029 B2 | 7/2007 | Lichman et al. | |

(Continued)

OTHER PUBLICATIONS

Hilterman, et al. "Seismic wide-angle processing to avoid stretch." SEG Expanded Abstracts 22, 215 (2003).*

(Continued)

Primary Examiner—Ian J Lobo

(57) ABSTRACT

A computer-implemented method of accounting for angle-dependent wavelet stretch in seismic data based on a novel relationship between wavelet stretch and the cosine of a reflection angle of an acoustic ray. Conventional seismic data having at least one wavelet, such as data generated from a reflection seismic survey, is accessed. The data is processed such that at least one wavelet is subject to angle-dependent wavelet stretch. A reflection angle for at least one wavelet is also determined. An operator is utilized to calculate a wavelet stretch factor for at least one wavelet based on the cosine of the corresponding reflection angle of the wavelet. The wavelet stretch factor is applied to the seismic data to account for angle-dependent wavelet stretch.

9 Claims, 9 Drawing Sheets

U.S. PATENT DOCUMENTS

2002/0141287 A1* 10/2002 Lazaratos .................. 367/120
2004/0199330 A1* 10/2004 Routh et al. ................. 702/14
2006/0235666 A1    10/2006 Assa et al.

OTHER PUBLICATIONS

Ayon K. Dey and Laurence R. Lines, Investigating the Randomness Assumption in Wavelet Estimation, CREWES Research Report, 1997, pp. 22-1 to 22-11, vol. 9.

Yong Xu and Satinder Chopra, Improving AVO Fidelity by NMO Stretching and Offset Dependent Tuning Corrections, Arcis Newsletter Q4—2006, pp. 1-13, Arcis Corporation, Calgary.

John C. Bancroft, The NMO Stretch Factor and Dip Limits in EOM, CREWES Research Report, 1996, pp. 26-1 to 26-5, vol. 8.

Tariq Alkhalifah, Velocity Analysis using Nonhyperbolic Moveout in Transversely Isotropic Media, Department of Geophysics, Nov.-Dec. 1997, pp. 1839-1854, vol. 62 No. 6, Stanford University, Stanford, California.

Hilterman and Patzek, "Advanced reservoir imaging using frequency-dependent seismic attributes," DOE Grant Proposal (2004) www.cage.uh.edu/rql/doe_projects/DOE_UC%20Berkeley.pdf.

\* cited by examiner

METHOD OF ACCOUNTING FOR WAVELET STRETCH IN SEISMIC DATA

RELATED APPLICATIONS

This application is a divisional of U.S. patent application Ser. No. 11/201,549, filed Aug. 11, 2005, incorporated by reference herein.

BACKGROUND OF THE INVENTION

1. Field of the Invention

The present invention relates generally to a method of accounting for angle-dependent wavelet stretch in seismic data. More particularly, the invention relates to a method of accounting for angle-dependent wavelet stretch in seismic data based on a novel relationship between wavelet stretch and a reflection angle of an acoustic ray.

2. Description of the Prior Art

The use of seismic surveys is now fundamental in the search for oil and gas reservoirs in the earth. Seismic surveys, including seismic reflection surveys, are typically performed by imparting acoustic energy of a known amplitude and frequency pattern at one or more locations of the earth (either at a land surface or in a marine environment) and then detecting reflected and refracted acoustic energy at other locations. The time delay between the imparting of the acoustic energy at the source location and the detection of the same wave at a receiver location is indicative of the depth at which a particular reflecting geological interface is located. The field of seismic data interpretation is concerned with techniques for analyzing the detected seismic waves to determine both the location and the properties of various geological strata.

As is known in the art, common depth point and other conventional seismic survey approaches utilize a plurality of source and receiver pairs to emit and detect acoustic energy or rays. However, due to the physical offset between different source and receiver pairs, acoustic energy or rays are detected at different times by the plurality of receivers. Thus, traces and wavelets resulting from conventional seismic survey approaches are often subject to shifting, known as normal move-out, caused by the physical offset between different source and receiver pairs.

Conventional and well-known methods, commonly referred to as normal move out correction, have long been employed to correct for normal-move out and its undesirable effects. However, normal move out correction, and other prestack processes such as time migration and depth migration, stretch wavelets as a function of angle. This angle-dependent stretching of the wavelet, commonly referred to as normal move-out stretch or angle-dependent wavelet stretch, results in the undesirable loss of high frequency data at far offset. The wavelet stretch flattens out the peaks of the wavelets, thereby extending the time length of each pulse over a wider range than an unstretched wavelet, resulting in energy bleeding. Such distortion or stretch is obviously undesirable, as it results in the loss of data which may be required or useful for additional analysis.

Various methods of accounting for angle-dependent wavelet stretch exist. However, these methods are generally unduly complex and require extensive calculations or modeling of data. As a result of this complexity, prior art methods of accounting for angle-dependent wavelet stretch generally require a great expenditure of human time and/or computing time, thereby preventing widespread use of the prior art methods. Furthermore, such complex and extensive calculations may not be easily included or implemented in existing methods or computer programs, thereby further inhibiting use of the prior art methods.

Additionally, prior art methods of accounting for wavelet stretch generally are unable to account for wavelet stretch in more than one situation. For instance, prior art methods which are operable to correct angle-dependent wavelet stretch in normal move out corrected data may not be operable to forward model wavelet stretch on seismic data. Similarly, prior methods for forward modeling wavelet stretch on seismic data may not be operable to correct for angle-dependent wavelet stretch, etc.

OBJECTS AND SUMMARY OF THE INVENTION

It is, therefore, an object of the present invention to provide a method of more easily accounting for angle-dependent wavelet stretch in seismic data.

Another object of the present invention is to provide a method of accounting for angle-dependent wavelet stretch based on a relationship which may be easily calculated without requiring undue expenditures of human time and/or computing time, and which allows the method to be easily implemented in existing methods or computing programs.

Still another object of the present invention is provide a method of accounting for angle-dependent wavelet stretch which may correct for angle-dependent wavelet stretch and forward model wavelet stretch utilizing similar equations or operators such that both stretch correction functions and forward modeling functions may be easily implemented.

It should be understood that the above-listed objects need not all be accomplished by the invention claimed herein. Further objects and advantages of the present invention will be apparent from the detailed description of the preferred embodiment, the claims, and the drawing figures.

Accordingly, in one embodiment of the present invention, there is provided a method of accounting for angle-dependent wavelet stretch in seismic data. The method comprises the step of: applying to the seismic data an operator that relates wavelet stretch to the cosine of a wavelet reflection angle.

In accordance with another embodiment of the present invention, there is provided a method of accounting for angle-dependent wavelet stretch in seismic data having a plurality of wavelets. The method comprises the steps of: (a) determining reflection angles for the wavelets, (b) processing the seismic data such that the wavelets are subject to angle-dependent wavelet stretch; (c) utilizing an operator to calculate a wavelet stretch factor for at least one wavelet based on the cosine of the wavelet's reflection angle; and (d) applying the wavelet stretch factor to each corresponding wavelet in the seismic data to correct angle-dependent wavelet stretching.

In accordance with a further embodiment of the present invention, there is provided a method of accounting for angle-dependent wavelet stretch in seismic data having a plurality of synthetic wavelets. The method comprises the steps of: (a) determining reflection angles for the wavelets; (b) utilizing an operator to calculate a wavelet stretch factor for at least one wavelet based on the cosine of the wavelet's reflection angle; and (c) applying the wavelet stretch factor to each corresponding wavelet in the seismic data to model angle-dependent wavelet stretch.

In accordance with a still further embodiment of the present invention, there is provided a method of accounting for angle-dependent wavelet stretch in seismic data having a plurality of wavelets. The method comprises the steps of: (a) processing the seismic data such that the wavelets are subject to angle-dependent wavelet stretch; (b) determining a wavelet stretch factor for at least one wavelet; and (c) utilizing an operator to calculate a reflection angle for at least one wavelet in the seismic data based on the arccosine of the wavelet's determined wavelet stretch factor.

BRIEF DESCRIPTION OF THE DRAWING FIGURES

A preferred embodiment of the present invention is described in detail below with reference to the attached drawing figures, wherein.

Figure 8:
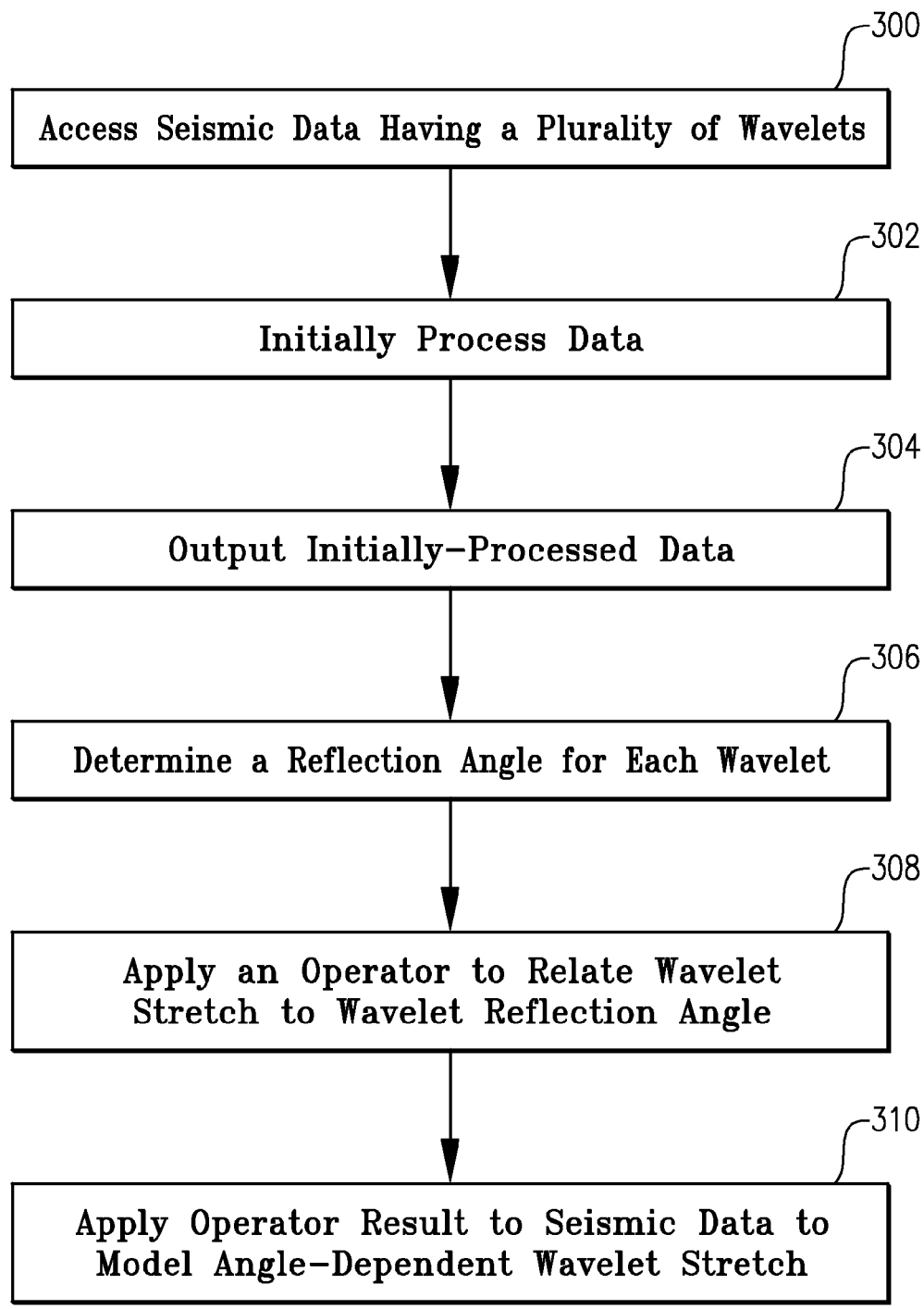
Figure 9:
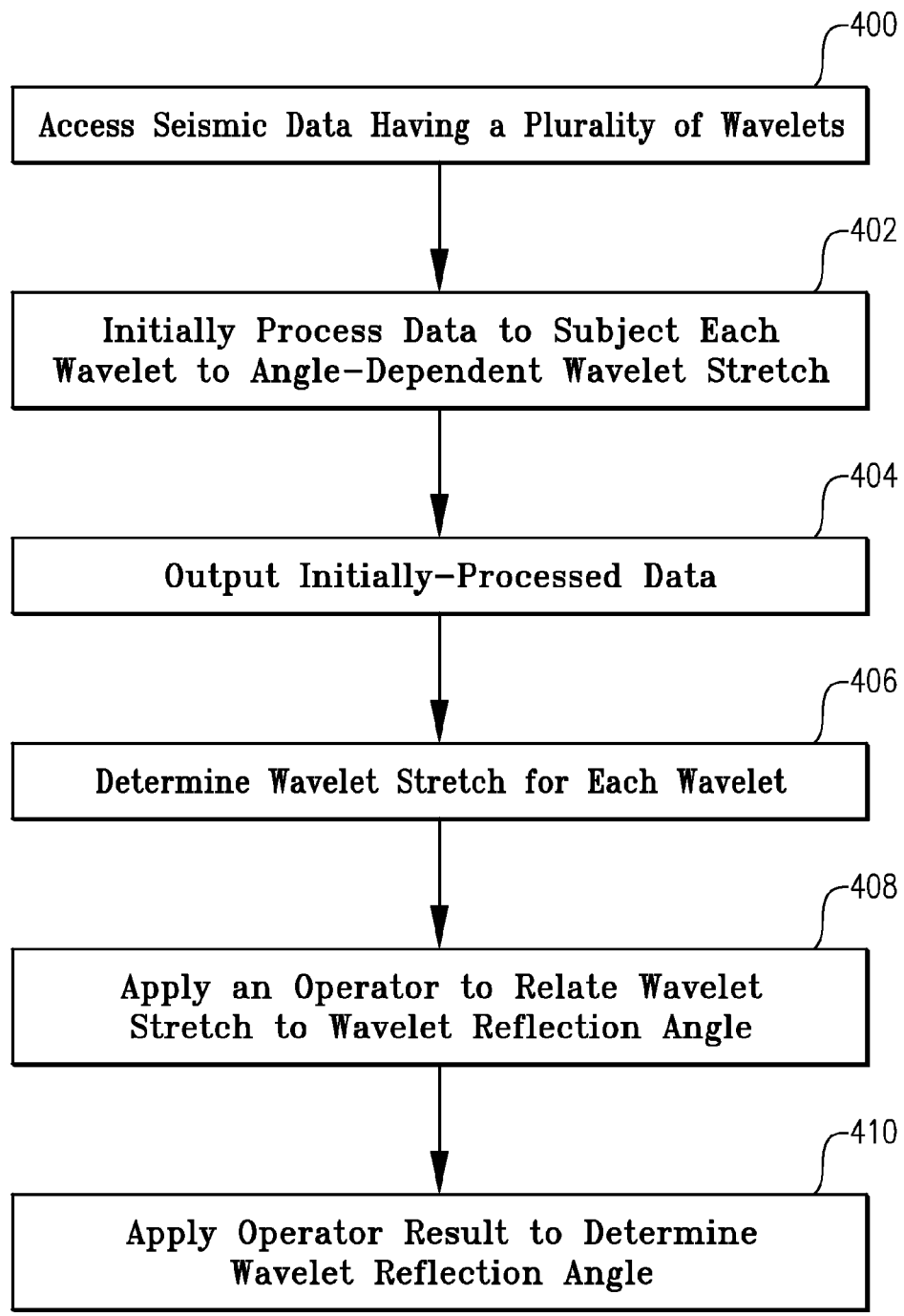

FIG. 8 is a flow chart outlining the steps of a third preferred embodiment of the present invention for accounting for angle-dependent wavelet stretch by forward modeling the effect of wavelet stretch utilizing a wavelet stretch factor; and FIG. 9 is a flow chart outlining the steps of a fourth preferred embodiment of the present invention for accounting for angle-dependent wavelet stretch by calculating a wavelet reflection angle from a wavelet stretch factor.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The present invention involves a method of accounting for wavelet stretch in seismic data. Preferably, the method is computer-implemented such that the steps of the method described herein can be programmed and stored on a device readable by a computing device such as a personal computer, a workstation, a computer network comprising a plurality of computers, a mainframe or distributed computing system, a portable computing device, or any combination thereof. Suitable program storage devices include, for example, a portable computer diskette, a random access memory (RAM), a read-only memory (ROM), an erasable, programmable, read-only memory (EPROM, FPGA, or Flash memory), an optical fiber, a portable compact disc (CD), and a digital video disc (DVD).

Figure 1:
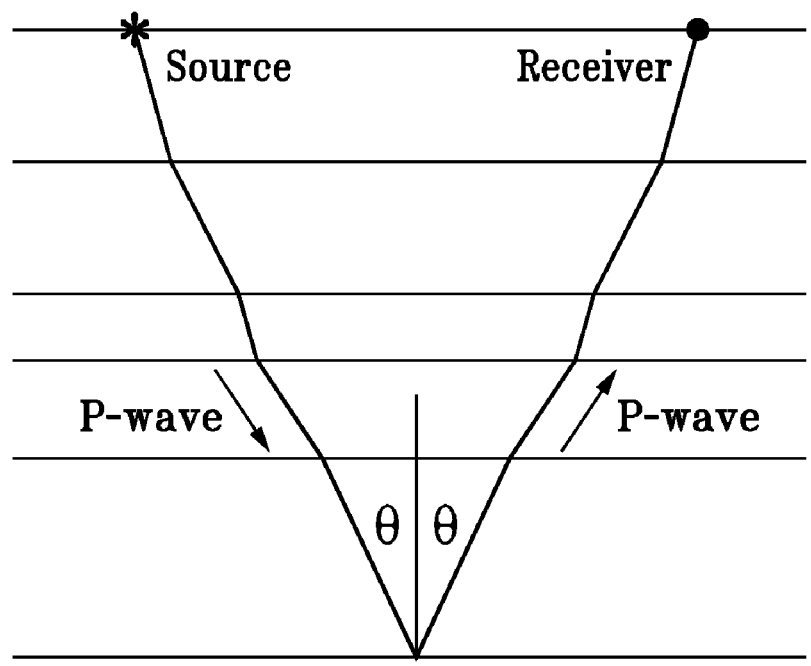
FIG. 1 is a seismic ray diagram illustrating a path of an acoustic ray as it travels from a source to a receiver in a conventional reflection seismic survey.

Referring to FIG. 1, a conventional seismic ray diagram resulting from a conventional reflection seismic survey is illustrated. The conventional seismic survey is performed by imparting acoustic rays of a known amplitude and frequency at one or more locations of the earth and then detecting, with a receiver, reflected and refracted acoustic rays at one or more surface locations. Specifically, a plurality of acoustic rays are sequentially generated at sources along a path while a plurality of receivers record reflections for each source. Thus, conventional reflection seismic surveys utilize a plurality of source and receiver pairs. The plurality of source and receiver pairs include a zero-offset pair which corresponds to the pair representing a source and receiver positioned directly above a common depth point or midpoint. All other source and receiver pairs are offset from the zero-offset pair by a physical distance, x. The received data is organized into a gather of traces each corresponding to the common depth point or midpoint. Each trace includes at least one wavelet representing a portion of the trace.

The seismic ray diagram of FIG. 1 illustrates the path of a single acoustic ray from a source to a subsurface reflector and then back to a receiver. The depicted reflection angle θ is the angle measured between the seismic ray and a line normal to the subsurface reflector. As can be seen, the reflection angle θ differs from an angle measured near the receiver or source, due to the "bending" of the acoustic ray as it passes through one or more subsurface isotropic mediums. Thus, the reflection angle θ of the present invention does not refer to the reflection angle measured or detected at the surface.

Figure 2:
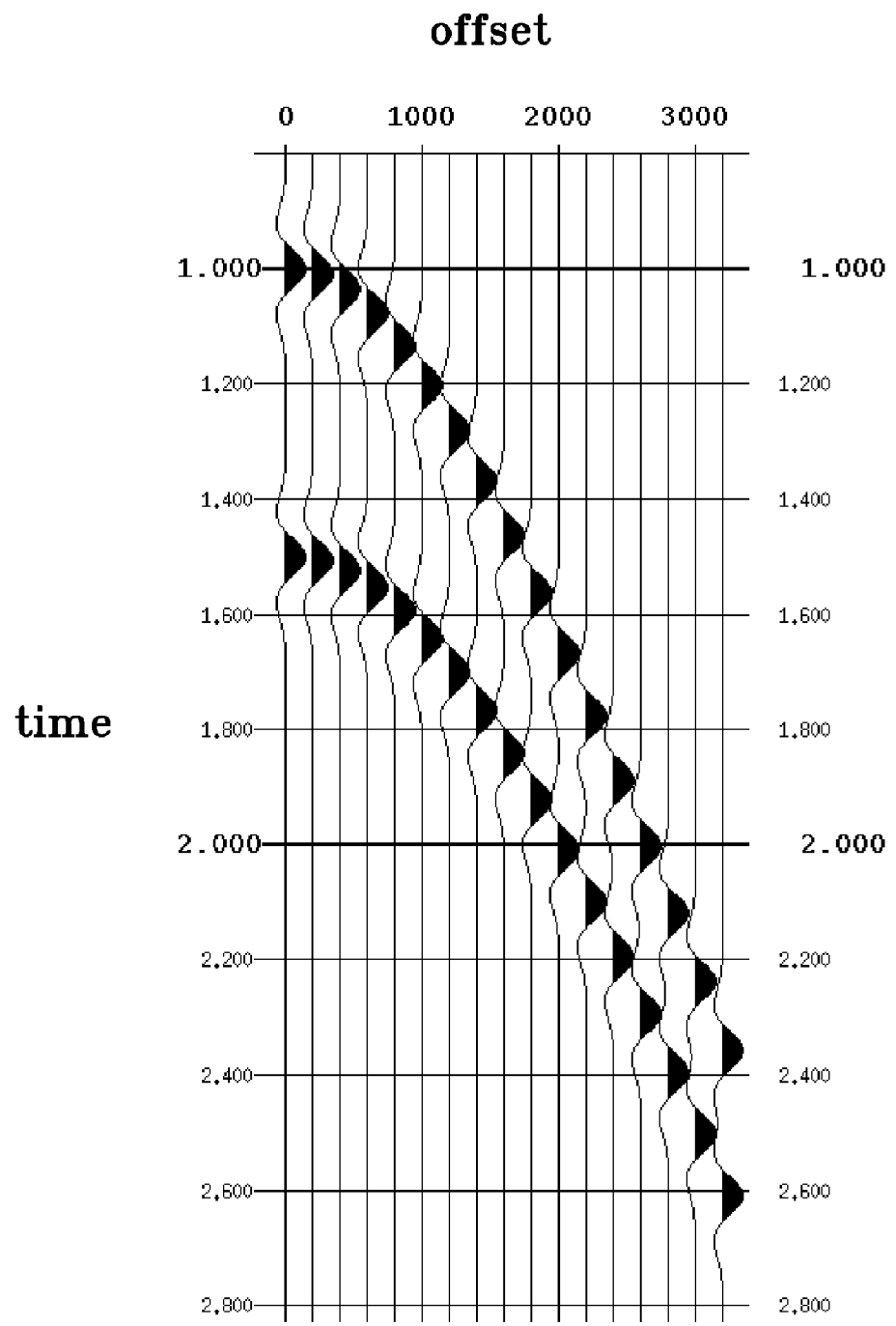
FIG. 2 is a graphical display of typical seismic data demonstrating normal move out.

Referring to FIG. 2, seismic data including two example events is shown before the application of normal move-out (NMO) correction or other prestack imaging processes. The move-out of each wavelet, caused by the physical offset, x, between source and receiver pairs and the zero-offset pair, is readily observable. As can be seen, the move-out for each wavelet generally increases as the offset x increases due to the greater distance the acoustic ray must travel. Such move-out is generally undesirable in seismic data, and may be corrected through conventional means.

Figure 3:
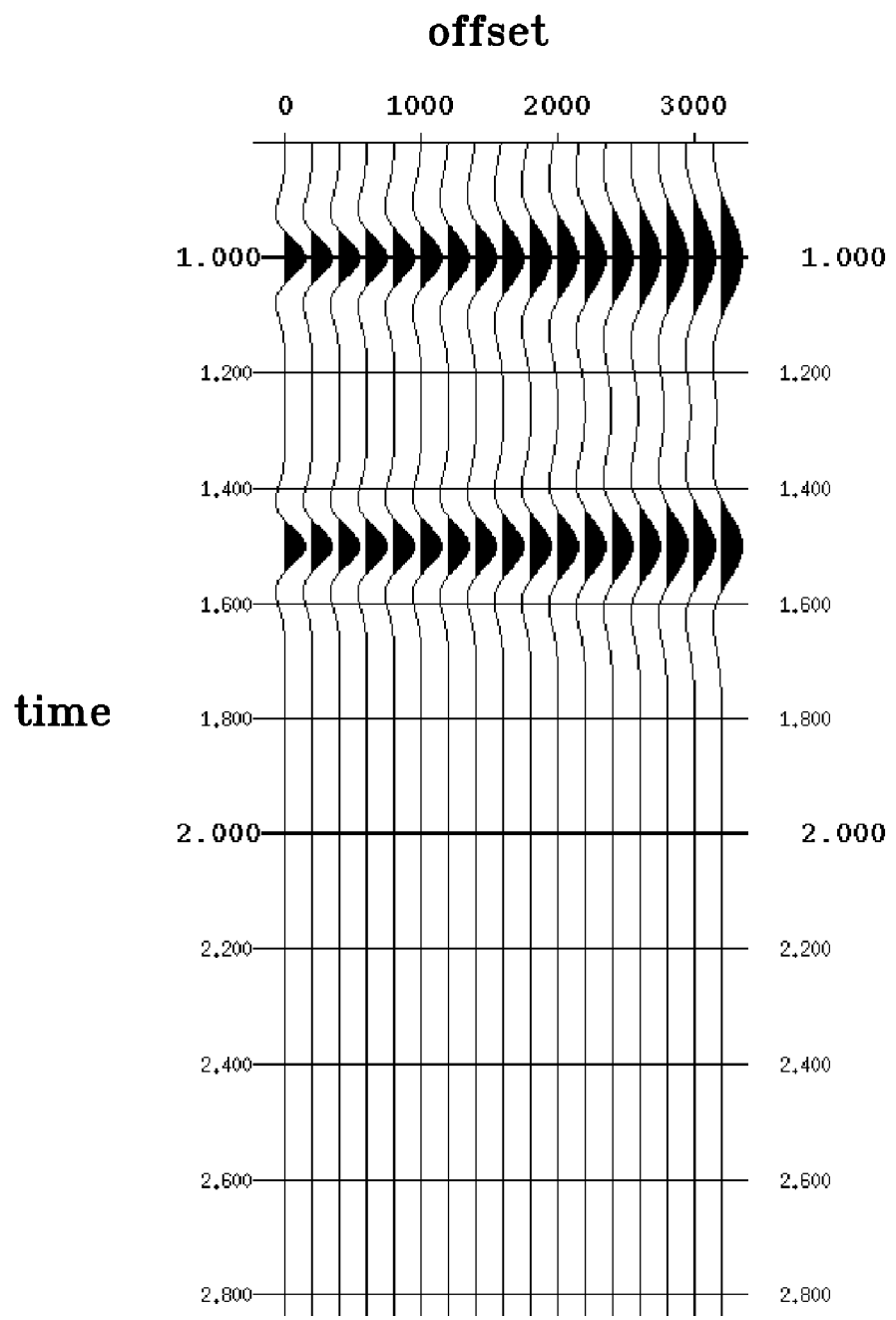
FIG. 3 is a graphical display of the typical seismic data of FIG. 2 after the correction of normal move out.

Referring to FIG. 3, the seismic data of FIG. 2 is illustrated after the application of conventional NMO correction, which has eliminated the readily observable and undesirable move-out. However, as demonstrated by FIG. 3, NMO correction, and other prestack imaging processes utilized in analyzing seismic data, including prestack time migration and prestack depth migration, stretch the wavelet as a function of offset or angle of incidence. This angle dependent stretching of the wavelet, commonly referred to as normal move-out (NMO) stretch or angle-dependent wavelet stretch, results in the undesirable loss of high frequency data at far offset. The wavelet stretch flattens out the peaks of the wavelets, thereby extending the time length of each pulse over a wider range than an unstretched wavelet. Such distortion or stretch is obviously undesirable, as it results in the loss of data which may be required or useful for additional analysis.

The cosine of the reflection angle, θ, provides a value for the amount of wavelet stretch which may be utilized to account for angle dependent wavelet stretch This relationship and value holds exactly for all angles if move out corrections or other prestack imaging processes are calculated using the exact equations for a horizontally layered isotropic medium. The relationship and value are a good approximation for a range of angles up to 30 degrees when move out corrections or other prestack imaging processes are employed using other standard and conventional equations based on the usual approximations employed in common depth or midpoint processing.

Figure 4:
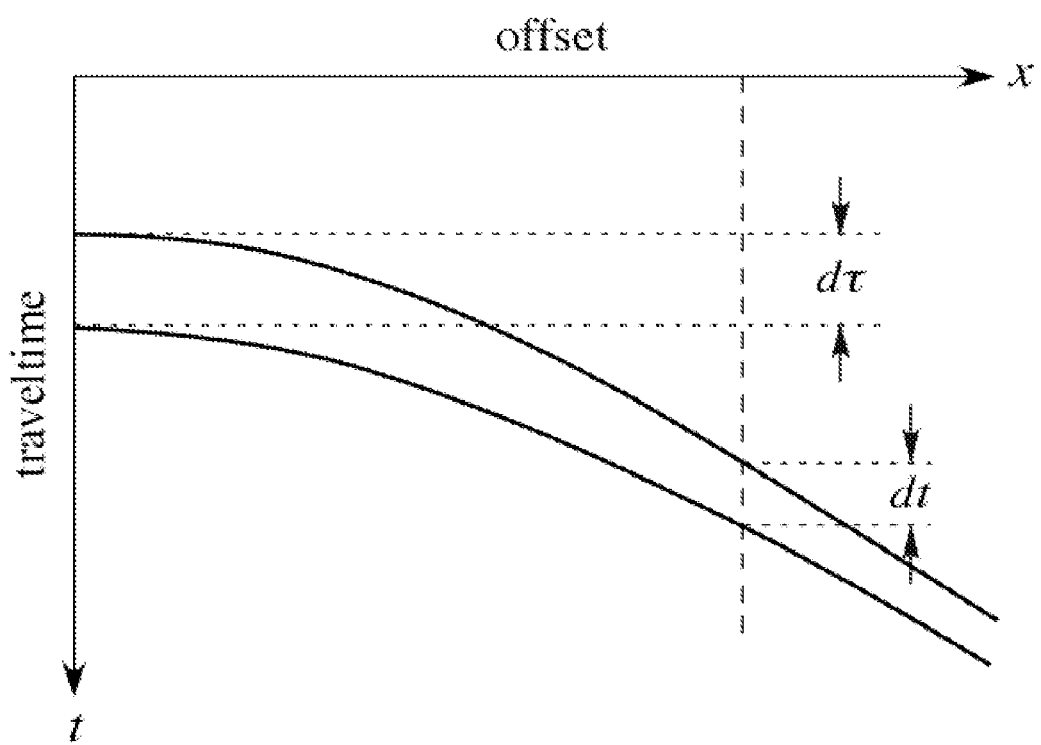
FIG. 4 is an offset versus traveltime plot showing normal move out of two acoustic rays.
Figure 5:
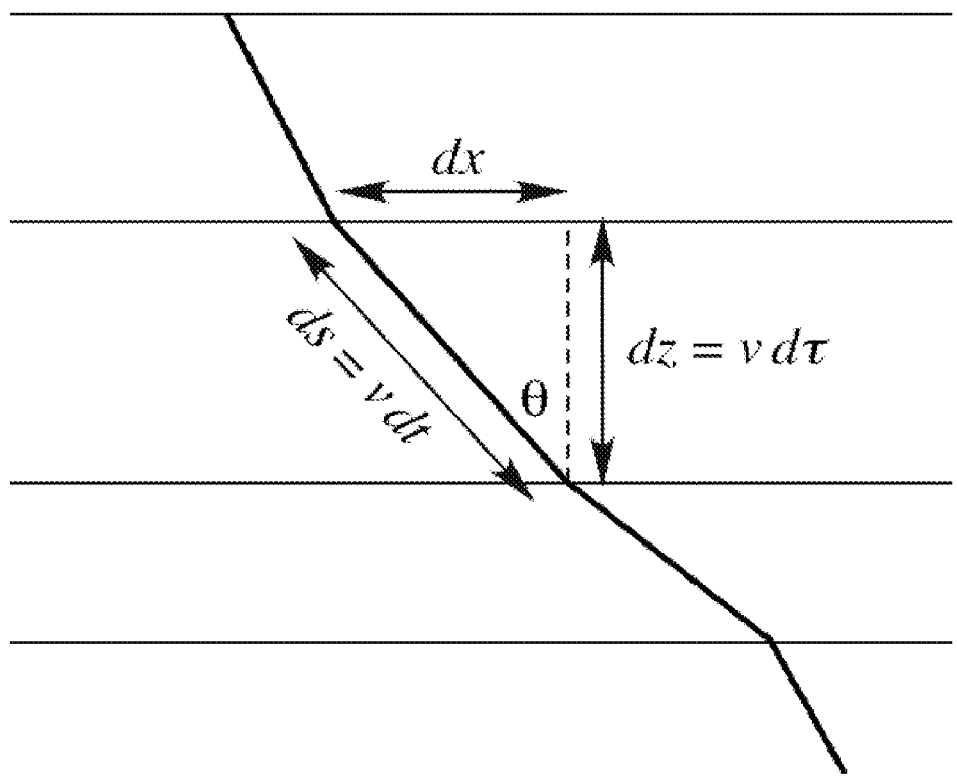
FIG. 5 is a graphical display of an acoustic ray passing through multiple subsurface mediums.

Referring to FIGS. 4 and 5, the relationship between the cosine of the reflection angle θ and wavelet stretch is derived utilizing parametric moveout equations and the chain rule. Snell's law (equation 1) is utilized to express reflection angle (θ) time (t), and offset (x) in terms of vertical traveltime (τ) and ray parameter (p) in parametric moveout equations 2 and 3 as follows:

$$p = \frac{\sin\theta}{v} \quad (1)$$

$$t = t(\tau, p) = \int_0^\tau \frac{d\tau'}{\sqrt{1 - p^2 v(\tau')^2}} \quad (2)$$

$$x = x(\tau, p) = \int_0^\tau \frac{pv(\tau')^2 d\tau'}{\sqrt{1 - p^2 v(\tau')^2}} \quad (3)$$

Equations 2 and 3 are differentiated as follows to determine ∂x/∂p for constant τ:

$$\left.\frac{\partial t}{\partial \tau}\right|_p = \frac{1}{\sqrt{1 - p^2 v^2}} \quad (4)$$

$$\left.\frac{\partial t}{\partial p}\right|_\tau = \int_0^\tau \frac{pv^2 d\tau'}{(1 - p^2 v^2)^{3/2}} \quad (5)$$

$$\left.\frac{\partial x}{\partial \tau}\right|_p = \frac{pv^2}{\sqrt{1 - p^2 v^2}} \quad (6)$$

$$\left.\frac{\partial x}{\partial p}\right|_\tau = \int_0^\tau \frac{v^2}{\sqrt{1 - p^2 v^2}} + \frac{p^2 v^4}{(1 - p^2 v^2)^{3/2}} \quad (7)$$

$$\left.\frac{\partial x}{\partial p}\right|_\tau = \int_0^\tau \frac{v^2 d\tau'}{(1 - p^2 v^2)^{3/2}} \quad (8)$$

Next, the chain rule is utilized to relate dt in terms of dτ and dp:

$$dt = \left.\frac{\partial t}{\partial \tau}\right|_p d\tau + \left.\frac{\partial t}{\partial p}\right|_\tau dp \quad (9)$$

To determine ∂t/∂τ for a constant x, dx is set to 0:

$$dx = \left.\frac{\partial x}{\partial \tau}\right|_p d\tau + \left.\frac{\partial x}{\partial p}\right|_\tau dp = 0 \quad (10)$$

$$dp = -\left(\frac{\left.\frac{\partial x}{\partial \tau}\right|_p}{\left.\frac{\partial x}{\partial p}\right|_\tau}\right) d\tau \quad (11)$$

$$dt = \left.\frac{\partial t}{\partial \tau}\right|_p d\tau - \left.\frac{\partial t}{\partial p}\right|_\tau \left(\frac{\left.\frac{\partial x}{\partial \tau}\right|_p}{\left.\frac{\partial x}{\partial p}\right|_\tau}\right) d\tau \quad (12)$$

$$\left.\frac{\partial t}{\partial \tau}\right|_x = \left.\frac{\partial t}{\partial \tau}\right|_p - \left.\frac{\partial t}{\partial p}\right|_\tau \left(\frac{\left.\frac{\partial x}{\partial \tau}\right|_p}{\left.\frac{\partial x}{\partial p}\right|_\tau}\right) \quad (13)$$

Combining equations 4-8 with equation 13 relates wavelet stretch, ∂t/∂τ, to the cosine of the reflection angle θ:

$$\left.\frac{\partial t}{\partial \tau}\right|_p = \frac{1}{\sqrt{1 - p^2 v^2}} \quad (14)$$

$$\left.\frac{\partial t}{\partial \tau}\right|_x = \frac{1 - p^2 v^2}{\sqrt{1 - p^2 v^2}} = \sqrt{1 - p^2 v^2} \quad (15)$$

$$\left.\frac{\partial t}{\partial \tau}\right|_x = \cos(\theta) \quad (16)$$

Such a relationship is generally more useful, as described below, than the readily obtainable geometric relationship:

$$\left.\frac{\partial t}{\partial \tau}\right|_p = \frac{1}{\cos(\theta)}$$

Figure 6:
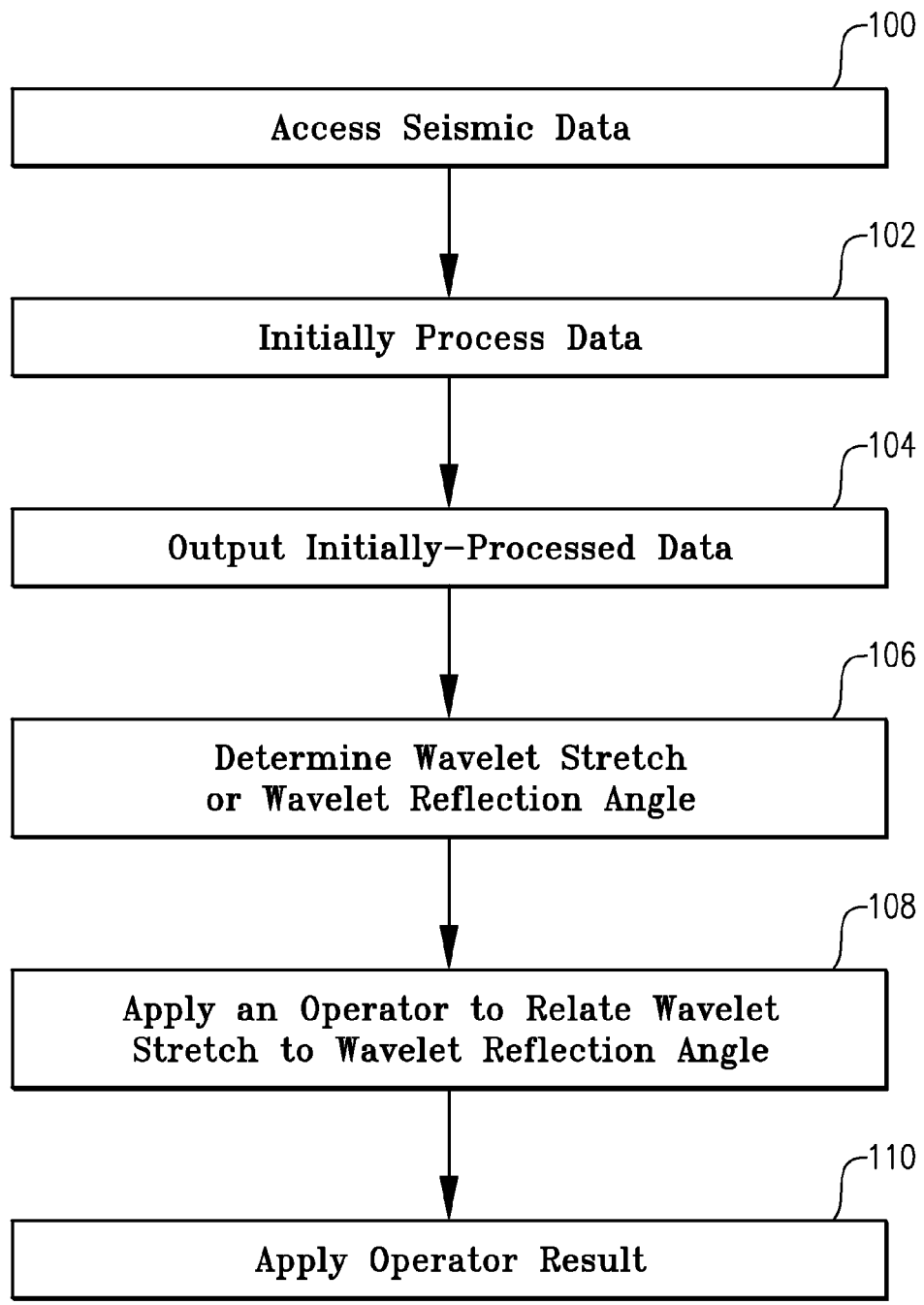
FIG. 6 is a flow chart outlining the steps of a first preferred embodiment of the present invention for accounting for angle-dependent wavelet stretch.

Steps 100-110 in FIG. 6 outline the inventive method of a first preferred embodiment for accounting for angle-dependent wavelet stretch in seismic data. In step 100 (FIG. 6), seismic data is accessed for utilization in accordance with the present invention. The seismic data may include data from a reflection seismic survey, as described above, rock property data from well logs, or any other form of conventional seismic data. Preferably, the seismic data includes at least one trace representing a receiver detected acoustic ray from a conventional seismic survey. Additionally, each trace preferably includes at least one wavelet representing at least a portion of the trace.

In step 102 (FIG. 6) the seismic data is initially processed for use with the method. Specifically, the seismic data is formatted for additional use or analysis. The processing may include prestack imaging, time migration, depth migration, normal move-out correction to correct for wavelet move out, forward modeling, the generation of synthetic seismograms or synthetic wavelets, angle stacking, the estimation of an unstretched wavelet, etc. In step 104 (FIG. 6) the processed data is outputted for additional analysis and use.

In step 106 (FIG. 6) wavelet stretch or wavelet reflection angle θ is determined from the seismic data. Preferably, wavelet stretch or wavelet reflection angle is determined for each wavelet having a unique reflection angle θ in the seismic data. The determination of wavelet stretch may be measured by the difference between a stretched wavelet and an unstretched wavelet or estimated by the difference between a stretched wavelet and an estimated unstretched wavelet. The reflection angle θ, which represents the normal to the angle at which the imparted acoustic ray reflected from a sub-surface feature or interface, may be determined through conventional means, such as ray tracing. However, the reflection angle θ must be determined in a manner for that accounts for ray-bending, as described above.

In step 108 (FIG. 6), an operator is applied to relate wavelet stretch to wavelet reflection angle θ based on the relationship derived above in detail. Wavelet stretch may be represented by a wavelet stretch factor which is expressed as:

$$\left.\frac{\partial t}{\partial \tau}\right|_x = \cos(\theta)$$

wherein ∂τ is the vertical time difference between two seismic events at an offset distance of zero and ∂t is the vertical time difference between the two seismic events at an offset distance of x. The operator which relates the cosine of the reflection angle to the wavelet stretch factor may be expressed as:

$$\left.\frac{\partial t}{\partial \tau}\right|_x$$

wherein ∂τ is the vertical time difference between two seismic events at an offset distance of zero, ∂t is the vertical time difference between the two seismic events at an offset distance of x, and θ is the wavelet reflection angle measured between a seismic ray and a line normal to a subsurface reflector reflecting the ray at an offset distance of x. Preferably, the operator is determined for each wavelet having a unique reflection angle θ present in the seismic data, such that a wavelet stretch factor or a wavelet reflection angle is calculated for each wavelet having a unique reflection angle θ.

In step 110 (FIG. 6) the operator result is applied to the seismic data. The calculated wavelet stretch factor may be applied to the seismic data to correct for angle dependent wavelet stretch or the wavelet stretch factor may be inversely applied to estimate or forward model a stretched wavelet. If the reflection angle θ is unknown and the wavelet stretch factor is known, the reflection angle θ may be determined by calculating the arccosine of the reciprocal of the stretch factor. Preferably, the operator is applied to each wavelet present in the seismic data based on the wavelet stretch factor or wavelet reflection angle for each wavelet.

Upon application of the operator, the seismic data may be utilized in additional prestack processes, including conventional prestack inversion. As is known in the art, prestack inversion may include two parameter and three parameter determination of rock property data, including impedance, poisson's ratio, and rock density. The present invention is uniquely suited for applications involving prestack inversion, as the present invention may be easily applied to remove angle dependent wavelet stretch, thereby reducing the probability that incorrect inversion results are generated by energy bleeding caused by the stretched wavelets at far offset. Furthermore, by removing wavelet stretch before stacking the wavelets, a high-resolution stack is created due to the additional information provided by the corrected wavelets.

Figure 7:
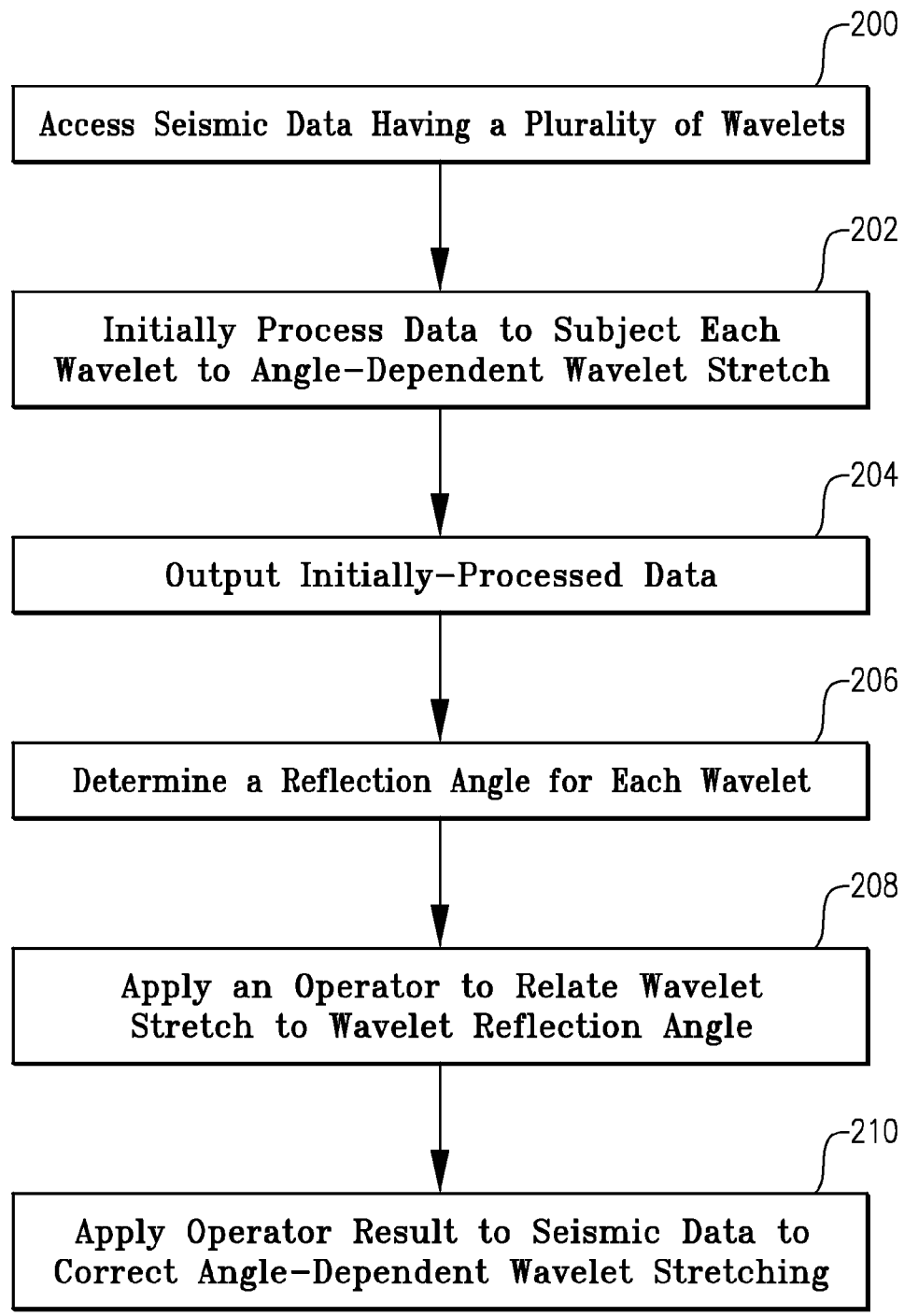
FIG. 7 is a flow chart outlining the steps of a second preferred embodiment of the present invention for accounting for angle-dependent wavelet stretch by correcting wavelet stretch utilizing a wavelet stretch factor.

Steps 200-210 in FIG. 7 outline the inventive method of a second preferred embodiment for accounting for angle-dependent wavelet stretch in seismic data. In step 200 (FIG. 7) seismic data is accessed for utilization with the method of the second embodiment. The seismic data is preferably conventional seismic data generated from a conventional seismic survey, such as the survey described above. The seismic data preferably includes a plurality of traces each having at least one wavelet.

In step 202 (FIG. 7), the seismic data is initially processed in a conventional manner to impose angle-dependent wavelet stretch on each wavelet in the seismic data. Thus, the initial processing may include NMO correction, time migration, depth migration, or any other prestack processes that imposes angle-dependent wavelet stretching.

Additionally, the initial processing preferably includes an estimation of an unstretched wavelet. The estimate of the unstretched wavelet is utilized to determine a stretched wavelet, as described in detail below. Preferably, an unstretched wavelet is estimated for each wavelet having a unique reflection angle θ present in the seismic data. The unstretched wavelet is represented by W(t) when the wavelet is represented in the time domain and the unstretched wavelet is represented by V(ω) when the wavelet is represented in frequency domain. Thus, V(ω) is the Fourier transform of W(t).

The unstretched wavelet, W(t) or V(ω), is estimated through known and conventional means. The estimated unstretched wavelet does not need to be exact or exceedingly precise, and it may be off by a frequency-independent phase. The unstretched wavelet may be estimated utilizing conventional software, statistical methods including zero-phase wavelet estimation, or deterministic extraction methods which utilize a cross correlation of seismic survey data and well log data. Additional wavelet estimation methods are described in U.S. Pat. No. 6,654,692, which is incorporated herein by specific reference.

Furthermore the initial processing preferably includes conventional angle stacking of the seismic data. The angle stacking converts seismic data represented in the offset domain to seismic data represented in the angle domain. Thus, each wavelet and trace present in seismic data represented in the angle domain corresponds to a fixed angle, so that the amount of wavelet stretch within each wavelet is constant for each fixed angle. In contrast, each wavelet and trace present in seismic data represented in the time domain has varying wavelet stretched based on offset. Such varying wavelet stretch is undesirable as it complicates the calculations and operations described below. Additionally conventional angle stacking allows the seismic data to be easily utilized in conventional prestack inversion processes, as described above.

In step 204 (FIG. 7), the initially processed data is outputted for utilization with the method. The outputted processed data includes the estimated unstretched wavelet or wavelets and the corresponding stretched wavelets. The outputted processed data may additionally include other seismic information, such as the original seismic data.

In step 206 (FIG. 7), a wavelet reflection angle θ is determined for each wavelet in the seismic data. The reflection angle θ, which represents the normal to the angle at which the imparted acoustic ray reflected from a sub-surface feature or interface, may be determined through conventional means, such as ray tracing. However, the reflection angle θ must be determined in a manner for that accounts for ray-bending, as described above. Alternatively, the reflection angle θ may be previously determined, such that the reflection angle θ for each wavelet is present in the seismic data and additional calculations or determinations are not required.

In step 208 (FIG. 7), an operator is applied to calculate a wavelet stretch factor for each wavelet having a unique reflection angle θ. Wavelets having identical refection angles θ will have identical operators, thereby eliminating the need to specifically calculate a wavelet stretch factor or an operator for each wavelet. Wavelet stretch factor is expressed by the relationship described above in step 108 (FIG. 6):

$$\left.\frac{\partial t}{\partial \tau}\right|_x$$

The operator which calculates the wavelet stretch factor from the cosine of the reflection angle to the wavelet stretch factor is expressed by the relationship described above in step 108 (FIG. 6):

$$\left.\frac{\partial t}{\partial \tau}\right|_x = \cos(\theta)$$

Additionally, the operator preferably utilizes a filter which transforms a stretched wavelet into the estimated unstretched wavelet estimated of step 204 (FIG. 7). For wavelets represented in the time domain the filter is calculated to transform the stretched wavelet, represented by W([cos θ]t), wherein θ is the reflection angle and t is time, into the unstretched wavelet W(t). For wavelets represented in the frequency domain, the filter is calculated to transform the stretched wavelet, represented by (1/[cos θ])V(ω/[cos θ]) into the unstretched wavelet, represented by V(ω), where θ is the reflection angle and ω is frequency.

The filter utilized for wavelets represented in the time-domain is preferably a Wiener-Levinson optimal filter. The Wiener-Levinson optimal filter is a known and conventional filter often utilized in seismic data operations for predictive deconvolution. The Wiener-Levinson optimal filter as conventionally known is described in a number of works, including "Seismic Data Analysis—Processing, Inversion, and Interpretation of Seismic Data—Volume I" by Öz Yilmaz, published by the Society of Exploration Geophysicists (2001) and "Theory and Application of Digital Signal Processing" by Rabiner and Gold, published by Prentice-Hall (June 1975, ISBN: 0139141014), which are incorporated herein by specific reference. However, other recursive or deconvolution methods may be utilized, such as conjugate gradient, sparse spike assumption, and homomorphic methods.

The filter utilized for wavelets represented in the frequency domain to transform the stretched wavelet (1/[cos θ])V(ω/[cos θ]) into the unstretched wavelet V(ω) is given by (cos θ)V(ω)/V(ω/[cos θ]). Preferably, the filter is modified with a suitable prewhitening load or diagonal load to avoid undesirable overly large amplitudes at some frequencies. For instance, the prewhitening load or diagonal load prevents an overly large amplitude when the denominator of the operator is close to zero before the addition of the load.

In step 210 (FIG. 7), the operator result is applied to each wavelet in the seismic data to yield stretch-corrected wavelets. Preferably, the calculated operator filter, described above, is applied to the seismic data to correct for angle-dependent wavelet stretch. In the time domain, the computed filter is applied to the seismic data at reflection angle θ to remove the effect of wavelet stretch. In the frequency domain, the filter is multiplied by the frequency domain seismic data at reflection angle θ to remove the effect of wavelet stretch. Alternatively, the filter or operator may be applied to the seismic data at an angle other than the reflection angle θ.

Additionally, instead or completely removing wavelet stretch, the amount of wavelet stretch may be reduced to an amount that would be observed at some desired reference angle. Thus, wavelet stretch may be completely removed from seismic data, reduced to simulate stretch at a specified reference angle, reduced to a determined level, or be modified or altered to any other desired amount or level including zero and non-zero levels.

Furthermore, a high-cut frequency filter may be utilized to prevent amplification of noise at high frequencies caused by the wavelet stretch correction. It is especially preferable to apply the high-cut filter to the seismic data when the seismic data is corrected for wavelet stretch at an angle other than the reflection angle θ. Any known and conventional high-cut frequency filter may be applied to prevent noise amplification.

Steps 300-310 in FIG. 8 outline the inventive method of a third preferred embodiment for accounting for angle-dependent wavelet stretch in seismic data. In step 300 (FIG. 8) seismic data is accessed for utilization with the method of the third embodiment. The seismic data may be conventional seismic data generated from a conventional seismic survey, such as the survey described above. Additionally, the seismic data may include conventional rock property data from well logs. The seismic data includes at least one wavelet which may represent an actual received wavelet from the conventional seismic survey or which may represent a synthetic wavelet generated from the conventional well log data or other sources.

In step 302 (FIG. 8) the seismic data is initially processed for use with the method. The initial processing does not impose angle-depending wavelet stretch on the seismic data. Preferably, when the seismic data includes conventional rock property data from well logs, the initial processing includes standard forward modeling of the seismic data to yield synthetic seismographs including a plurality of synthetic wavelets. Additionally, the initial processing may include an estimation of one or more unstretched wavelets. The unstretched wavelet is estimated in substantially the same manner as the estimation of step 202 (FIG. 7), and is represented by W(t) when the wavelet is represented in the time domain and by V(ω) when the wavelet is represented in frequency domain.

Furthermore, the initial processing of the seismic data preferably includes the conventional angle stacking described in step 102, which converts seismic data represented in the offset domain to seismic data represented in the angle domain.

In step 304 (FIG. 8), the initially processed data is outputted for utilization with the method. Preferably, the outputted processed data includes the synthetic and/or estimated unstretched wavelets. The outputted processed data may additionally include other seismic information, such as the original seismic data.

In step 306 (FIG. 8), a wavelet reflection angle θ is determined for each wavelet, actual, estimated, or synthetic, in the seismic data. The reflection angle θ, which represents the normal to the angle at which the imparted acoustic ray reflected from a sub-surface feature or interface, may be determined through conventional means, such as ray tracing. However, the reflection angle θ must be determined in a manner for that accounts for ray-bending, as described above. Alternatively, the reflection angle θ may be previously determined, such that the reflection angle θ for each wavelet is present in the seismic data and additional calculations or determinations are not required.

In step 308 (FIG. 8), an operator is applied to calculate an wavelet stretch factor for each wavelet having a unique reflection angle θ. Wavelets having identical refection angles θ will have identical operators, thereby eliminating the need to specifically calculate an stretch factor or operator for each wavelet. The wavelet stretch factor is expressed as:

$$\left.\frac{\partial t}{\partial \tau}\right|_x$$

wherein ∂τ is the vertical time difference between two seismic events at an offset distance of zero and ∂t is the vertical time difference between the two seismic events at an offset distance of x.

The operator is expressed as:

$$\frac{1}{\left.\frac{\partial t}{\partial \tau}\right|_x} = \frac{1}{\cos(\theta)}$$

wherein ∂τ is the vertical time difference between two seismic events at an offset distance of zero, ∂t is the vertical time difference between the two seismic events at an offset distance of x, and θ is the wavelet reflection angle measured between a seismic ray and a line normal to a subsurface reflector reflecting the ray at an offset distance of x. Thus, the wavelet stretch factor, which represents the amount of angle-dependent stretch is calculated for each wavelet having a unique reflection angle θ.

Additionally, a stretched wavelet may be determined for each unstretched wavelet based on the cosine of the reflection angle and the estimated unstretched wavelet. If the wavelets are represented in the time domain, the estimated unstretched wavelet is represented by W(t) and the stretched wavelet is represented by W([cos θ]t). If the wavelets are represented in the frequency domain and the unstretched wavelet is represented by V(ω), the stretched wavelet is represented by (1/[cos θ])V(ω/[cos θ]).

In step 310 (FIG. 8), the operator result is applied to each wavelet in the seismic data to forward model the effect of angle-dependent wavelet stretch by yielding stretched wavelets. To forward model the effect of angle-dependent wavelet stretch, the calculated wavelet stretch factor is applied to at least one wavelet in the seismic data. Additionally, the effect of wavelet stretch on seismic data may be forward modeled by inserting a pulse with the determined stretched wavelet of step 308 (FIG. 8) into the unstretched wavelets present in the seismic data to induce the effect of angle-dependent wavelet stretch. However, any conventional and known seismic forward modeling methods may be utilized.

Steps 400-410 in FIG. 9 outline the inventive method of a fourth preferred embodiment for accounting for angle-dependent wavelet stretch in seismic data. In step 400 (FIG. 9) seismic data is accessed for utilization with the method of the fourth embodiment in a substantially similar manner to step 200 (FIG. 7). Thus, the seismic data is conventional seismic data generated from a conventional reflection seismic survey and includes at least one wavelet, as described above. Furthermore the seismic data preferably includes a plurality of traces each having at least one wavelet.

In step 402 (FIG. 9) the seismic data is initially processed for use with the method in a substantially similar manner to step 202 (FIG. 7). Specifically, the seismic data is formatted for additional use or analysis. The processing may include prestack imaging, time migration, depth migration, normal move-out correction to correct for wavelet move out, forward modeling, the generation of synthetic seismogram or wavelets, the estimation of an unstretched wavelet, etc. The estimated unstretched wavelet may be estimated in the manner disclosed in step 202 (FIG. 7). The processing must impose angle-dependent wavelet stretch to the unstretched wavelets in the seismic data such that the amount of wavelet stretch may be determined, as described below. In step 404 (FIG. 9) the processed data is outputted for additional analysis and use in a substantially similar manner to step 204 (FIG. 7).

In step 406 (FIG. 9) the amount of angle-dependent wavelet stretch is measured or determined for each wavelet in the seismic data. The amount of wavelet stretch is determined by known and conventional means, such as by calculating the difference between an unstretched wavelet and a stretched wavelet or by calculating the difference between a stretched wavelet and an estimated ideal unstretched wavelet. Thus, it W1 is a measure of the frequency of the unstretched wavelet, and W2 is a measure of the frequency of the stretched wavelet, the wavelet stretch factor may be represented by W2/W1. Additionally, the stretch factor may be determined experimentally or empirically. The wavelet stretch factor may also be determined in a substantially similar manner to the wavelet stretch factor of step 206 (FIG. 7), and may be expressed in the same manner as:

$$\left.\frac{\partial t}{\partial \tau}\right|_x$$

In step 408 (FIG. 9) an operator is applied to calculate wavelet reflection angle θ for each wavelet. The reflection angle θ, which represents the normal to the angle at which the imparted acoustic ray reflected front a sub-surface feature or interface. The relationship, W2/W1 or the wavelet stretch factor of step 206 (FIG. 7) discussed above, may be utilized by the operator. The operator utilized to calculate wavelet reflection angle is expressed as:

$$\left.\frac{\partial t}{\partial \tau}\right|_x = \cos(\theta)$$

wherein, ∂τ is the vertical time difference between two seismic events at an offset distance of zero, ∂t is the vertical time difference between the two seismic events at an offset distance of x, and θ is the wavelet reflection angle measured between a seismic ray and a line normal to a subsurface reflector reflecting the ray at an offset distance of x.

In step 410 (FIG. 9), the operator result is applied to each wavelet in the seismic data to estimate wavelet reflection angle. Thus, specifically the reflection angle θ is determined by calculating the arccosine of the reciprocal of the stretch factor. If the stretch factor is represented by W2/W1, as in the above example, the reflection angle θ is the arccosine of W1/W2. Thus, when the amount of wavelet stretch is known, the reflection angle of the wavelet may be easily determined.

The preferred forms of the invention described above are to be used as illustration only, and should not be used in a limiting sense to interpret the scope of the present invention. Obvious modifications to the exemplary embodiments, including applying the above-described steps in an alternate order, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

The invention claimed is:

1. A method of accounting for angle-dependent wavelet stretch in seismic data, said method comprising: obtaining seismic data by imparting acoustic rays of known amplitude and frequency at one or more locations into the earth and then detecting, with a receiver, reflected and refracted acoustic rays at one or more surface locations wherein accounting for angle-dependent stretch preserves high frequency data for creating a subsurface image, applying to the seismic data an operator that relates wavelet stretch to the cosine of a wavelet reflection angle, wherein the operator directly relates a wavelet stretch factor to the cosine of the wavelet reflection angle, and wherein the wavelet stretch factor is expressed in the time domain as:

$$\left.\frac{\partial t}{\partial \tau}\right|_x$$

wherein $\partial \tau$ is the vertical time difference between two seismic events at an offset distance of zero and $\partial t$ is the vertical time difference between the two seismic events at an offset distance of x, wherein said applying of the operator includes using the operator to account for angle-dependent wavelet stretch in a forward modeling process.

2. The method as set forth in claim 1, wherein the forward modeling includes generating synthetic wavelets from an earth model and a known or estimated wavelet.

3. The method as set forth in claim 2, wherein each synthetic wavelet has a synthetic reflection angle associated therewith.

4. The method as set forth in claim 3, wherein ray tracing is utilized to determine the synthetic reflection angle.

5. The method as set forth in claim 3, wherein the synthetic reflection angle accounts for ray bending through a layered isotropic medium.

6. The method as set forth in claim 3, wherein the operator inversely relates a wavelet stretch factor to the cosine of the synthetic reflection angle.

7. The method as set forth in claim 2, wherein the wavelet stretch factor is expressed in the time domain as:

$$\left.\frac{\partial t}{\partial \tau}\right|_x$$

wherein $\partial \tau$ is the vertical time difference between two synthetic seismic events at an offset distance of zero and $\partial t$ is the vertical time difference between the two synthetic seismic events at an offset distance of x.

8. The method as set forth in claim 6, wherein the operator is expressed in the time domain as:

$$\left.\frac{\partial t}{\partial \tau}\right|_x = \cos(\theta)$$

wherein $\partial \tau$ is the vertical time difference between two synthetic seismic events at an offset distance of zero, $\partial t$ is the vertical time difference between the two synthetic seismic events at an offset distance of x, and $\Theta$ is the wavelet reflection angle measured between a synthetic seismic ray and a line normal to a subsurface reflector reflecting the ray at an offset distance of x.

9. The method as set forth in claim 3 wherein the operator is applied to the synthetic wavelets to generate stretched synthetic wavelets.

* * * * *